United States Patent [19]

Leach et al.

[11] 4,010,099

[45] Mar. 1, 1977

[54] SETTLERS FOR COPPER LIQUID EXTRACTION SYSTEMS

[75] Inventors: Bruce E. Leach; Leroy Rose, both of Ponca City, Okla.

[73] Assignee: Continental Oil Company, Ponca City, Okla.

[22] Filed: July 10, 1975

[21] Appl. No.: 594,882

[52] U.S. Cl. .................................. 210/21; 75/117; 210/23 R; 210/DIG. 5; 423/24

[51] Int. Cl.² ........................................ B01D 11/04

[58] Field of Search .......... 75/117, 119; 210/23 R, 210/21, 40, 83, 84, DIG. 5; 423/24

[56] References Cited

UNITED STATES PATENTS

| | | |
|---|---|---|
| 3,276,995 | 10/1966 | McDonald, Jr. ............. 210/23 R X |
| 3,417,015 | 12/1968 | Canevari et al. ................. 210/23 R |
| 3,455,680 | 7/1969 | Ashbrook et al. .................... 75/117 |
| 3,479,378 | 11/1969 | Orlandini et al. ............... 423/24 X |
| 3,645,398 | 2/1975 | Fiocco .......................... 210/DIG. 5 |
| 3,703,573 | 11/1972 | Blytas ............................. 75/117 X |
| 3,796,788 | 3/1974 | Blickle et al. .................. 75/117 X |
| 3,810,832 | 5/1974 | Rhodes ............................ 210/23 R |

*Primary Examiner* — Frank A. Spear, Jr.
*Assistant Examiner* — Robert H. Spitzer
*Attorney, Agent, or Firm* — Cortlan R. Schupbach, Jr.

[57] ABSTRACT

Phase disengagement between aqueous copper sulfate solutions and organic phases containing a liquid ionic change reagent is greatly facilitated when the dispersed medium from the mixture stage is contacted countercurrently to the direction of phase separation with a small amount of the respective separated phase having uniform appropriate droplet size.

4 Claims, No Drawings

SETTLERS FOR COPPER LIQUID EXTRACTION SYSTEMS

This invention relates to an improved method for separating aqueous copper sulfate solutions from organic phases. More particularly, this invention relates to an improved method for separating aqueous copper sulfate solutions from organic phases by contacting the aqueous copper sulfate with large uniformly sized droplets of the respective organic phase; said contact being accomplished by providing a settler, either tank or pipe, with compartments to allow the droplets to form.

Acidic copper solutions from various sources such as dump leaching are processed to recover the copper by mixing with an organic phase containing a liquid ion exchange reagent and a diluent.

The process for conducting such extractions is well known in the art and consists of a series of mixing and settler stages. Such processes have been described many times. Representative of such descriptions are U.S. Pat. Nos. 3,573,182 and 3,479,378. These references show the counter-current method of contacting the aqueous acidic copper sulfate with an organic solvent. Normally, about three mixing and settling stages are required for extraction, and an equal number of stages required for stripping to remove copper from the organic phase. Typical solutions can contain from 10 to 30 percent of a liquid ion exchange reagent in a diluent from the organic phase, a saturated copper feed solution which contains Cu(II), Fe(II), Fe(III), etc., having a pH of less than about 2.5, and a stripping solution which contains about 20 grams per liter of Cu(II) and about 150 grams per liter sulfuric acid, from which the copper is subsequently electrodeposited.

Many different configurations of mixers and settlers have been devised in the art. Normally, the settler is a large rectangular tank; however, a pipeline mixer/settler can be used. Any process devised in the art has had difficulty with phase preparation, requiring large settling volumes or long residence times in order to avoid organic phase losses. This large time requirement for settling results in increased capital expense for settler size or length and an increased inventory of organic reagents.

It is therefore an object of the present invention to provide an improved method for separating aqueous copper sulfate solutions and organic phases for liquid copper extraction systems. Other objects will become apparent to those skilled in this art as the description proceeds.

It has now been found in accordance with the present invention that a surprising decrease in phase separation time can be achieved by contacting the dispersed medium from the mixer stage of the extraction system counter-currently to the direction of phase separation with a small amount of the organic separated phase at a velocity sufficiently low to prevent additional dispersion and with a uniform droplet size which can be varied so as to maximize coalescence and reduce secondary dispersions.

Droplet sizes can vary widely. Normally, droplet sizes range from about 0.001 cubic centimeter (cc) per droplet to about 0.05 cc/droplet. Larger or smaller droplets can be found depending on the precise configuration of the settler design and on the volume of solutions separated.

Representative examples of organic phases which can be used in the process of the present invention are diluents such as nonyl phenol, kerosine or paraffin solvents. Liquid ion exchange reagents can be used with the diluents. The liquid ion exchange reagents are normally present from about 10 to 20 volume percent; nonyl phenol is also added from about 10 to 20 volume percent in addition to the kerosine or paraffin solvents when 8-hydroxyquinolines are used. These concentrations are preferred, and of course can be varied to meet the particular process.

Velocity of contact can also vary widely. Normally, velocity of contact ranges from 1 gallon per minute per square foot of settler area (gpm 1 ft.$^2$) to 10 gpm 1 ft$^2$. Velocity of contact will also vary depending on whether settling tanks or pipe settlers are utilized.

Normally, such separation is carried out in the presence of a liquid ion exchange reagent. Representative examples of such reagents are $\alpha$-hydroxyoxime benzophenonoxime in a chemically inert organic solvent (sold as LIX 64-N by General Mills) and alkylated $\alpha$-hydroxyquinolines (sold as KELEX 100 and KELEX 120 by Ashland Chemical Company). The ion exchange resin is not critical to the present invention.

In the practice of the present invention, the phase disengagement between aqueous copper sulfate solutions and their organic phase containing a liquid ion exchange reagent is carried out in the manner previously described in the prior art, using counter-current phase separation methods. The improvement resides in providing this settling tank of the line separator with waffle-like compartments in the bottom of said tank or line separator. The organic phase will coalesce or settle in these separators and then rise in droplets of uniform size to contact the aqueous solution and greatly facilitate the rate of phase disengagement.

The use of the improvement of the present invention has several advantages over the practice known to the prior art. The use of such an improvement will decrease the time required for the phase separation of organic and aqueous phases, thus reducing capital costs of the larger settlers previously needed. Should the improvement be made in existing settlers, increased production capacity and reduced inventory of organic reagents needed will be realized. In addition, secondary dispersions which lead to organic losses can be reduced.

The invention is more concretely described with reference to the example below in which all parts and percentages are by volume unless otherwise specified. The example is not intended to be limiting but merely to illustrate one embodiment of the present invention.

The solutions used in the examples were prepared as follows from the sulfate salts. The pregnant leach liquor used contained 4 grams per liter of Cu(II), 2 grams per liter of Fe(II), and 2 grams of Fe(III), having a pH of 2.0. The stripping solution contained 20 grams per liter of Cu(II) and 150 grams per liter of sulfuric acid. The organic phase contained 10 percent by volume of a liquid ion exchange reagent (LIX 64-N, sold by General Mills Corporation), and 90 percent of an isoparaffinic solvent (Exxon Isopar L).

EXAMPLE 1

Equal 150 cubic centimeter volumes of the organic and aqueous phase were stirred using a constant speed control (2,300 r.p.m.) for 1 minute to simulate a mixing stage. The stirrer had two levels of 45° (downward pitch) hemisphere blades. The stirring levels were at 100 and 240 cubic centimeters in a 500 milliliter graduated cylinder in each case. Two 500 cubic centimeter graduated cylinders were used as both mixers and settlers. The cylinders differed only in that one had a small tube in the bottom which permitted drainage of solutions upon completion of the tests. A small amount of aqueous phase remained in this narrow tube and was not completely mixed. Organic phase immediately above the tube opening also was only partially phase separated. All other variables were held constant. It was surprising that the cylinder having the narrow tube containing aqueous phase and organic phase in larger-than-normal particle size separated faster than a cylinder without the tube.

EXAMPLE 2

A second test was run blocking the tube. When the tube was blocked, the two graduated cylinders used as settlers gave comparable results. Volume of the tube used in the first example was approximately 1 to 2 milliliters as compared to a 300 milliliter total volume for the system.

The drainage tube therefore apparently acts as a coalescer in the system. A waffle-type bottom of a pipe is an effective coalescer as well as a waffle-type bottom in a standing tank.

The phase separation times are set forth in the table below showing the improvement of the present invention.

TABLE I

| PHASE SEPARATION TIMES | | |
|---|---|---|
| Aqueous Phase In Contact With Organic Phase | Cylinder With Tube | Cylinder Flat Bottom |
| 1. Pregnant Feed | 60 Seconds | 88 Seconds |
| 2. Stripping Solution | 43 Seconds | 55 Seconds |

While the examples of the present inventon were run in a vertical cylinder which would correspond to a standing settler tank in a plant operation, the invention will show improvement in a pipe separator as well.

While certain embodiments and details have been shown for the purpose of illustrating this invention, it will be apparent to those skilled in this art that various changes and modifications may be made herein without departing from the spirit or the scope of the invention.

I claim:

1. A method for counter-current phase separation of aqueous copper sulfate solutions and organic phases in substantially vertical settler tanks and substantially horizontal settler pipes wherein the aqueous copper sulfate solution and organic phase are contacted counter-currently to the direction of phase separation, comprising compartmenting the bottoms of said tanks and pipes, flowing said solutions and organic phases over said compartments to coalesce the organic phase to form droplets, said droplets then rising to contact the aqueous solution and facilitate phase disengagement.

2. The method of claim 1 wherein the droplet size ranges from about 0.001 cubic centimeter to about 0.05 cubic centimeter.

3. The method of claim 1 wherein the velocity of contact is from 1 gallon per minute per square foot up to about 10 gallons per minute per square foot.

4. The method of claim 1 wherein the organic phase contains an ion exchange reagent.

* * * * *